Jan. 3, 1956 M. R. DOCK 2,729,058
CHAIN SHACKLES HAVING A RESILIENT CLIP
Filed May 25, 1953 3 Sheets-Sheet 1

INVENTOR:
Mortimer Russell Dock.
BY
Watson Johnson Leavenworth & Blair
ATTORNEYS:

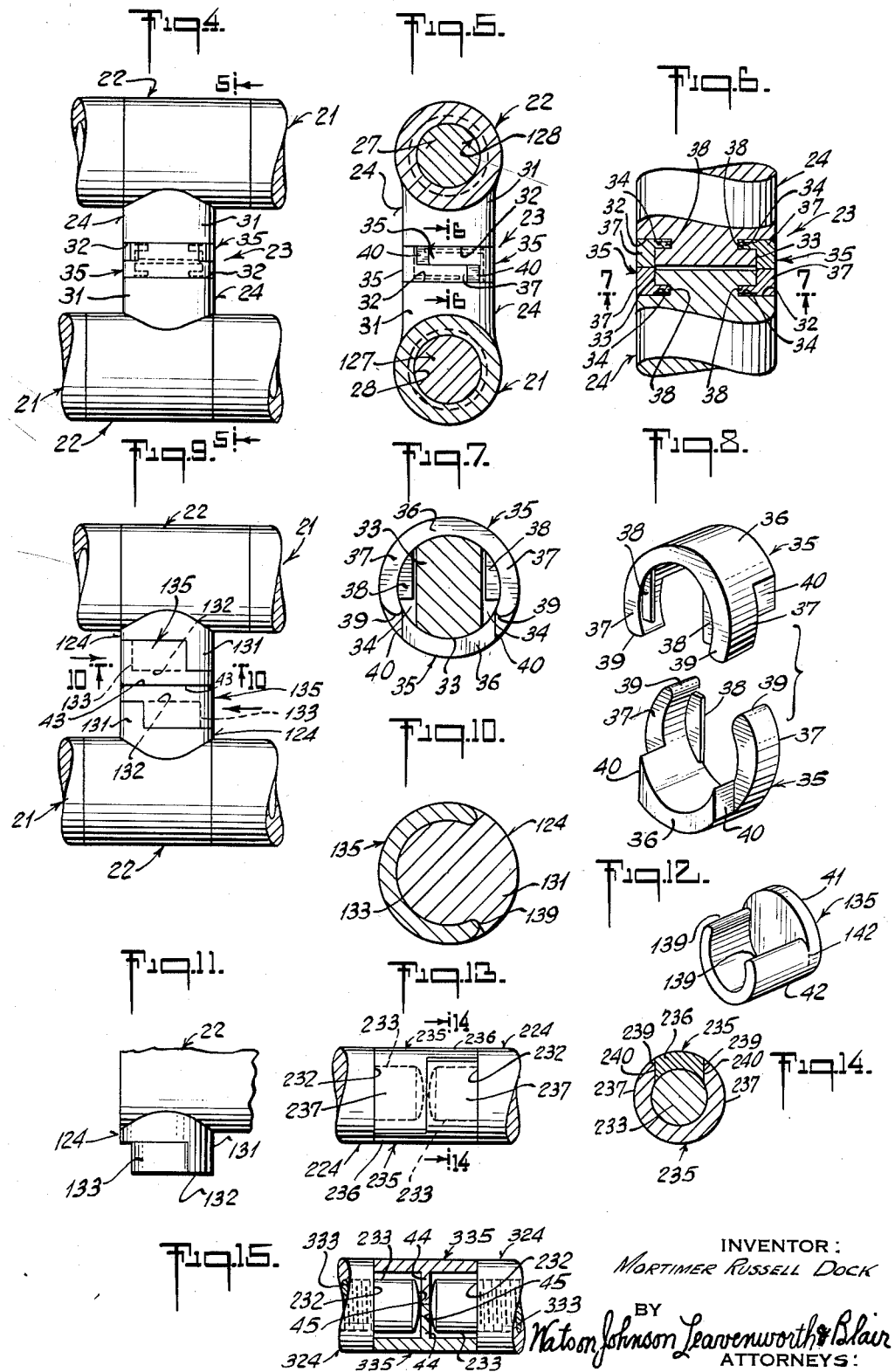

Jan. 3, 1956 M. R. DOCK 2,729,058
CHAIN SHACKLES HAVING A RESILIENT CLIP
Filed May 25, 1953 3 Sheets-Sheet 3
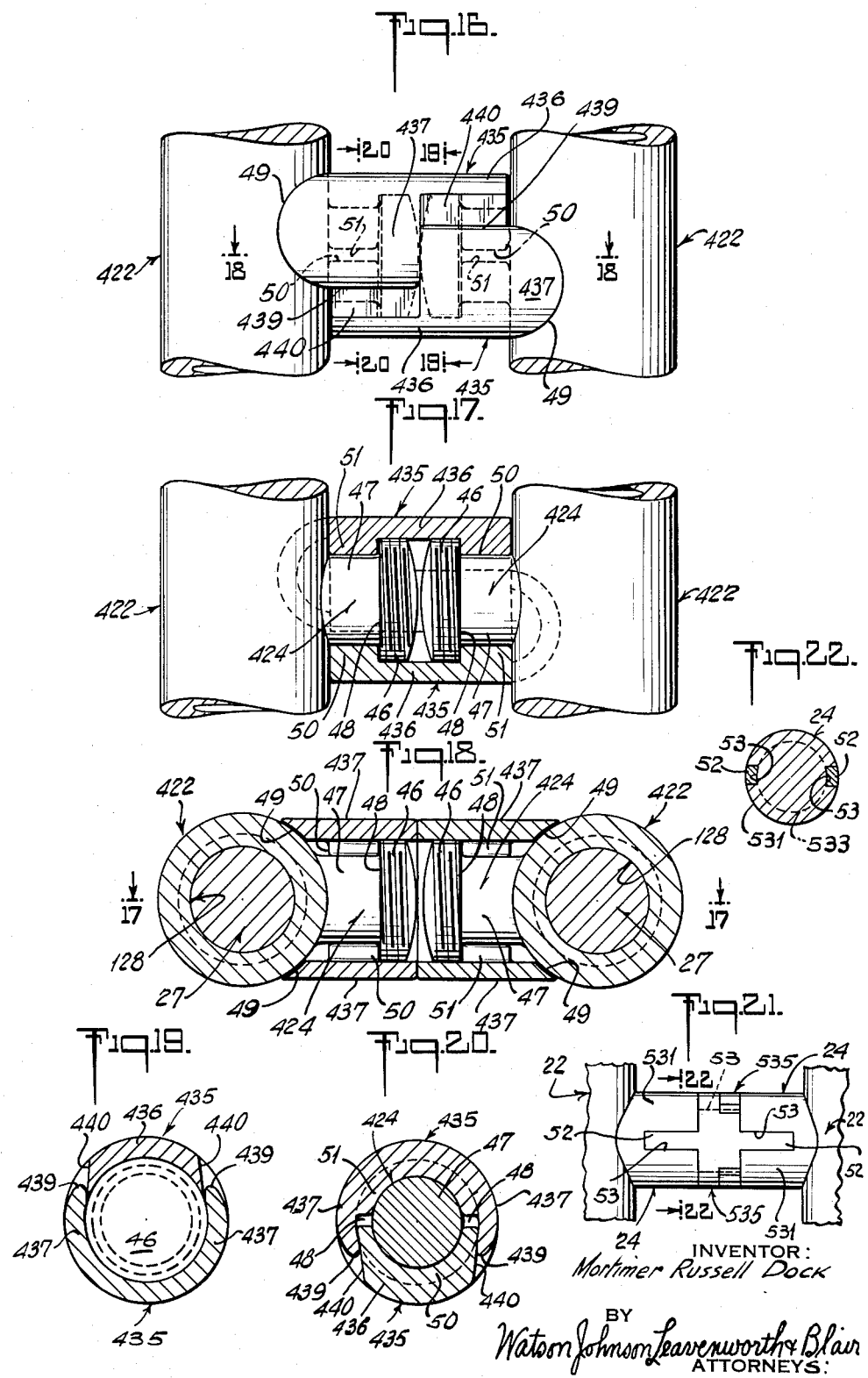
INVENTOR:
Mortimer Russell Dock
BY
Watson Johnson Leavenworth & Blair
ATTORNEYS

United States Patent Office 2,729,058
Patented Jan. 3, 1956

2,729,058

CHAIN SHACKLES HAVING A RESILIENT CLIP

Mortimer Russell Dock, Washington, D. C.

Application May 25, 1953, Serial No. 357,071

17 Claims. (Cl. 59—86)

The present invention relates to chain shackles and, more particularly, to those of the stud link type, constituting an improvement of the subject matter of my prior U. S. Patent No. 2,621,471 and my copending U. S. patent application Serial No. 290,739, filed May 29, 1952.

A general object of the present invention is to provide such a chain link shackle of balanced and symmetrical construction in which opposed stud lugs of link side sections are efficiently attached together or held in substantial alignment by abutment or filler means featuring snap engagement and disengagement, and which are economically producible in mass production in an effectively rapid manner.

A more specific object of the present invention is to provide in such shackle link structure an opposed pair of alignable stud lugs equipped to receive and carry parts of a device which efficiently holds the stud lugs in substantial alignment and which are mounted either to each other and/or to the stud lugs by snap engagement; the parts being preferably so designed and proportioned as to avoid projecting or extending elements or portions on the assembled cross stud.

A further object of the invention is to provide structural embodiments of the stud lug holding or connecting means, the parts of which are readily constructed, easily assembled, and permit efficient use and operation thereof.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 4 is a top plan view, with parts broken away, of the structure shown in Fig. 3 with the addition of the separate parts of the device employed to hold the stud lugs in substantial alignment;

Fig. 5 is a sectional view taken substantially on line 5—5 of Fig. 4;

Fig. 6 is an enlarged elevational view of the cross stud structure, with parts broken away, and sectioned substantially on line 6—6 of Fig. 5;

Fig. 7 is a sectional view taken substantially on line 7—7 of Fig. 6;

Fig. 8 is an exploded perspective of parts of the device employed in Figs. 4 to 7 incl. for maintaining the opposed stud lugs in substantial alignment;

Fig. 9 is a view similar to Fig. 4 of a modified form of stud lug and alignment maintaining means;

Fig. 10 is a sectional view taken substantially on line 10—10 of Fig. 9;

Fig. 11 is an elevational detail, with parts broken away, of stud lug structure of the Figs. 9 and 10 embodiment;

Fig. 12 is a perspective view of one of the two separate parts employed in the Figs. 9 and 10 embodiment to maintain substantial alignment of the stud lugs;

Fig. 13 is a side elevational view, with parts broken away, of a further modified form of cross stud structure;

Fig. 14 is a sectional view taken substantially on line 14—14 of Fig. 13;

Fig. 15 is a side elevational view, with parts broken away, of a modified form of the structure shown in Figs. 13 and 14, and with the parts constituting the stud lugs alignment maintaining means being shown substantially in axial section;

Fig. 16 is an enlarged top plan view similar to Fig. 4 of a further embodiment of the present invention;

Fig. 17 is a view similar to Fig. 16 but with the parts of the alignment maintaining device being sectioned substantially on line 17—17 of Fig. 18;

Fig. 18 is a sectional view taken substantially on line 18—18 of Fig. 16;

Fig. 19 is a sectional view taken substantially on line 19—19 of Fig. 16;

Fig. 20 is a sectional view taken substantially on line 20—20 of Fig. 16;

Fig. 21 is a plan view similar to Fig. 4, with additional parts broken away, of a still further embodiment of the invention; and Fig. 22 is a sectional view taken substantially on line 22—22 of Fig. 21.

Figure 1:
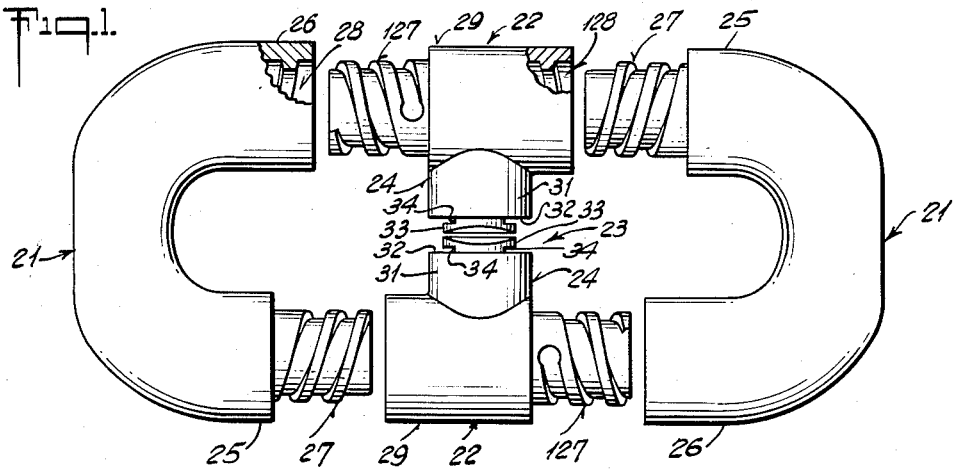
Fig. 1 is an exploded plan view of an embodiment of a stud link chain shackle, characterized by cross stud structure of the present invention, with the parts thereof shown in their relative laid-out positions preparatory to assembly, but with the separate parts of the stud lug connecting means omitted.

Referring to the drawings, in which like numerals identify similar parts throughout, it will be seen that a preferred embodiment of the present invention may comprise a pair of opposed, substantially semi-elliptical end sections 21, 21 and a pair of interposed side sections 22, 22. The side sections 22, 22 are equipped with parts of a cross stud structure 23. The cross stud structure 23 comprises a pair of opposed stud lugs 24, 24 which, together with means for maintaining them in substantial alignment, is the chief concern of the present invention. Otherwise, the features and characteristics of the other link shackle parts are similar or like those of my above-identified copending application Serial No. 290,739, thus being formed of suitable strong metallic material such as steel.

Figure 2:
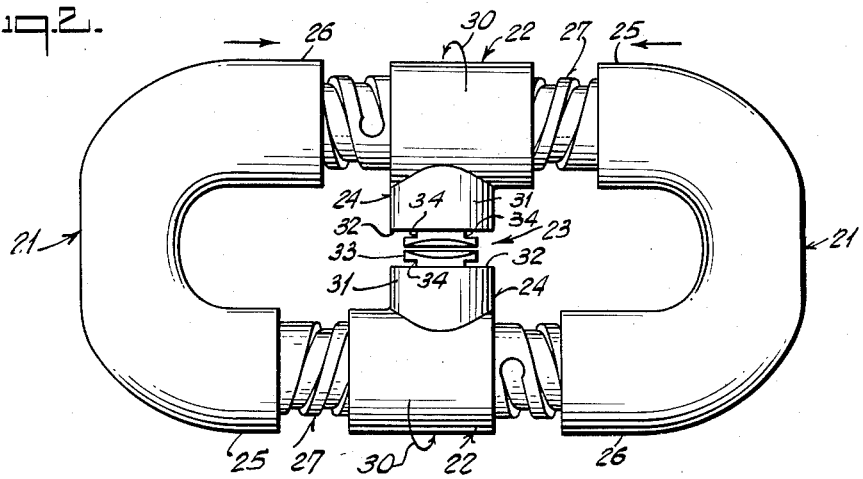
Fig. 2 is a plan view of the structure shown in Fig. 1, with the link parts shown in their initial relative positions as they are slid to contact and socket reception preparatory to subsequent rotary engagement.
Figure 3:
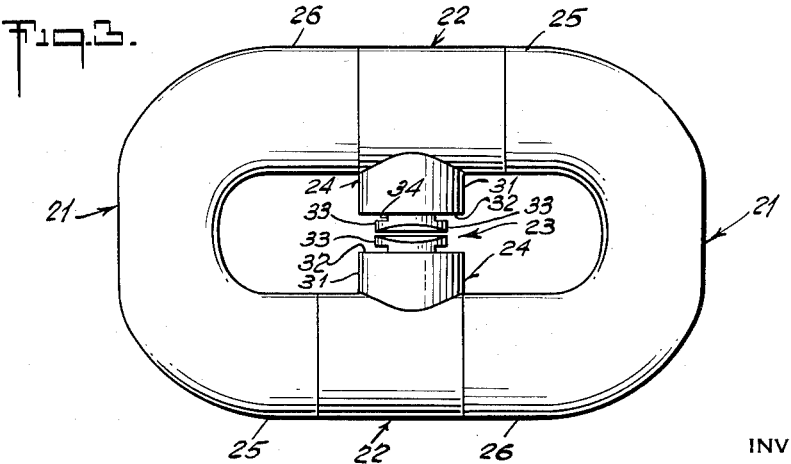
Fig. 3 is a top plan view of the structure shown in Figs. 1 and 2, indicating relative positions of parts after they have been assembled to form a finished chain shackle.

As is more fully pointed out in that patent application and as will be noted from Figs. 1 to 3 incl., each semi-elliptical end section 21 has end portions 25 and 26. End portion 25 carries an externally threaded male member 27 and the other end portion 26 is provided with an internally threaded female socket 28. The threads of the male member 27 and female socket 28 of either end section 21 are opposite in hand.

Each side section 22 comprises a main body 29 from one side of which extends its stud lug 24, preferably made integral therewith. One end of each side section body 29 is provided with an externally threaded male member 127, mateable with the internally threaded socket 28 of either end section 21. The other end of side section body 29 is provided with an internally threaded socket 128, mateable with the male member 27 of either end section 21.

Before proceeding with a detailed description and recital of the operation of the various embodiments of the stud lug structures and means for maintaining them in substantial alignment or connecting them together, the mode of assembly of the parts shown in Fig. 1 to attain the assembled structure of Fig. 3 will be here recited. A pair of the substantially semi-elliptical end sections 21, 21 are laid out, preferably on a flat surface in laterally-spaced relation, with the male member 27 of one opposed to the female socket 28 of the other, in approximate alignment as illustrated in Fig. 1. Each of a pair of side link sections 22, 22 is then interposed between each pair of opposed male member 27 and female socket 28, with the stud lugs 24, 24 thereof arranged in apposition and substantially aligned as shown in Fig. 1; and with the female socket 128 of each side section 22 opposed to the adjacent male member 27 of one of the end sections 21.

The opposed end sections 21, 21 are then pushed toward each other to engage the male members 27, 27 into the female sockets 128, 128 and the male members 127, 127 into the female sockets 28, 28, as is graphically illustrated in Fig. 2. The side sections 22, 22 are then rotated in opposite directions to draw up the male member threads into the threads of the female sockets, as is indicated by the arrows 30, 30 in Fig. 2, finally, tightly to draw the four link sections together to form the assembly of Fig. 3.

As will be noted from Figs. 1 to 3 incl., each stud lug 24 preferably is in the form of a section 31 of cylindrical stock, from the free end 32 of which extends, preferably coaxially, a reduced section 33, preferably in the form of a substantially cylindrical projection or nub, thereby providing a circular shoulder at 32. The free end of each nub 33 may be chamfered off on opposite sides, as shown, to permit free passing with close juxtaposition when the side sections 22, 22 are rotated in opposite directions. Each nub 33 of the Figs. 1 to 8 incl. embodiment is provided with a pair of diametrically-located, transverse notches 34, 34, which preferably extend substantially parallel across opposite sides of each nub 33, as will be understood from Figs. 1 to 3 incl. and 6, with the nub stock remaining therebetween constituting a neck of less transverse width than the outer head end thereof. Of course, an annular groove may be substituted for the diametrically-located notches 34, 34 to form the nub neck, such as is taught in the Figs. 16 to 20 incl. embodiment.

The means for connecting stud lugs 24, 24 together in the substantial alignment illustrated in Fig. 3, or to maintain that alignment, may, in accordance with the present invention, comprise, as illustrated in Figs. 4 to 8 incl., a pair of interfittable, C-shaped members 35, 35 made preferably from steel having certain resiliency. Each connecting or alignment-maintaining member 35 comprises a main portion 36 of a width or axial length substantially equal to the spacing between the opposed ends or shoulders 32, 32 of the stud lug bodies 31, 31. From opposite sides of the main portion 36 of each member 35 extend in opposed, laterally-spaced relation a pair of curved or arcuate fingers 37, 37. The axial dimension of each finger is approximately one-half the width or axial length of the portion 36 so that a pair of the fingers 37, 37 of one member 35 may be lapped against the sides of the other pair of fingers 37, 37 of the other member 35, substantially to fill in or bridge the space between the opposed abutments or shoulders 32, 32, with those two members together constituting a symmetrical plural-parts filler collar or ring means to be assembled about the opposed stud lug nubs or heads 33, 33. Each finger 37 carries on the inside thereof a transversely-extending rib or fin 38 receivable in one of the notches 34—34. Thus, as will be seen from Figs. 6 and 7, one of the C-shaped members 35 may be placed laterally over one of the aligned stud lugs nubs 33, 33, with its opposed fins 38, 38 received in notches 34, 34 of this stud lug nub, and forming therewith interlocking means.

As is best seen in Fig. 7, the fingers 37, 37, while having their inside surfaces defined by circular arcs of a radius substantially equal to the radius of each cylindrical lug head or nub 33, extend appreciably beyond the diametrical plane so that their opposed tips 39, 39 are spaced apart appreciably less than the diameter of the lug head. Since each member 35 preferably is formed of resilient material, such as spring steel, when the pair of opposed fins 38, 38 thereof are entered into the notches 34, 34 of one lug head 33 and that member is driven laterally into the space between the opposed ends 32, 32 of the lug head bodies 31, 31, the finger tips 39, 39 will be sprung apart to receive the lug head therebetween and will then snap toward each other on the far side of the latter. Thus, each C-shaped member 35 is snapped into position and securely held on one of the lug heads 33.

After assembly in that fashion of one of the C-shaped members 35 on one of the lug heads 33, the other like C-shaped member is engaged about the other lug head from the opposite side so that its fingers 37, 37 will slide along the sides of and lap the fingers 37, 37 of the other C-shaped member, thus to fill in substantially all of the cylindrical surface of the filler collar assembly. The second C-shaped member, of course, has its fins 38, 38 also engaged in the notches 34, 34 of the lug head 33 about which it is forced or driven laterally so that its finger tips 39, 39 snap therebeyond for secure anchorage. The main portion 36 of each C-shaped member 35 is defined adjacent the roots of its pair of fingers 37, 37 by side faces 40, 40, which may be susbtantially parallel. As is best seen in Fig. 7, side faces 40, 40 may be laterally spaced apart approximately the distance between the tips 39, 39 of the other interfitting member 35, so as to minimize the size and extent of notches or recesses in the external cylindrical surface of the assembled filler collar comprising a pair of the C-shaped members 35, 35. The outer diameter of the assembled plural-parts filler ring or collar means 35, 35 is approximately equal to the diameters of the stud lug bodies at their outer ends 32, 32 for substantial mergence of their external surfaces.

The resulting assembly, best understood from Figs. 4 and 5, thus includes a filler collar structure, comprising a pair of interfitted C-shaped members 35, 35 which together snugly fill the space between the opposed ends 32, 32 of the stud lug bodies 31, 31. The filler collar assembly thus constitutes an abutment means interposed between end structures of stud lugs so as to maintain them in substantial alignment, thereby avoiding any undue tendency for the side sections 22, 22 to rotate relative to each other and to the end sections 21, 21 with attendant tendency to loosen the threaded connections of those link shackle sections. The snap engagement of each stud lug head 33 by one of the C-shaped filler collar members 35 assures that the parts will be maintained securely together despite rough handling and usage, such as in service as a link in an anchor chain and in the handling thereof by equipment, such as wildcats, and in storage in chain lockers.

Intentional disassembly of link shackle parts is readily permitted so as to allow disconnection of chain sections or repair or replacement of parts. For example, one may readily drive off one of the C-shaped members 35 from the lug head 33 about which it is snapped by striking the tip 39 of one of its fingers 37 a sharp blow to back that member off and snap its fingers back past the lug head. The other C-shaped member 35 may be removed in a similar manner. With such lateral withdrawal of the filler ring members 35, 35 from opposite sides of the opposed heads 33, 33 of the stud lug bodies 31, 31, the stud lugs 24, 24 may be rotated relative to each other with the side sections 22, 22. This permits unthreading disassembly of the link side sections 22, 22 relative to the link end sections 21, 21; and thus sections of the chain may be readily disconnected or worn parts of shackles may be easily replaced. Further, such chain link shackles can be produced economically on a mass production basis at a price which will even permit quick hand assembly of whole sections of anchor chains formed only of such shackle links, since not only are the end sections 21, 21 and side sections 22, 22 made as interchangeable, duplicate parts, but also the two parts of the filler collar assembly are duplicate C-shaped members 35, 35.

Another embodiment of the present invention is illustrated in Figs. 9 to 12 incl. As therein indicated, each of the opposed pair of stud lugs 124, 124 may comprise a substantially cylindrical body 131 having a transverse end 132, with the curved surface of a relatively wide zone extending arcuately at least more than 180° cut back to provide the C-shaped shallow notch 133. The space between the opposed ends 132, 132 of the stud lug bodies 131, 131 is to be filled in by a two-part filler assembly in the form of a pair of cup-like members 135, 135, each having a section of its side wall removed to provide a gap, as is best seen in Fig. 12. Each filler member 135, which has been aptly termed a "half-shell," preferably comprises a substantially circular, transversely-extending bottom or end portion 41 substantially one-half the thickness of the space between the opposed lug ends 132, 132. C-shaped side wall section 42 extends from an arcuate portion of the edge of the end section 41, preferably normal thereto and along a circular arc greater than 180°. Opposed end edges 139, 139 of the side wall section 42 are thus spaced apart a distance or by a gap less than the diameter of the arcuate notch 133. Accordingly, filler member 135 may be mounted to one of the stud lugs 124 by snapping its C-shaped side wall section 42 into the arcuate lug notch 133. Each filler member 135 is thus mounted to one of the stud lugs 124 by snap engagement similar to that of the mounting of one of the collar members 35 to one of the stud lugs 24 of the Figs. 1 to 8 incl. embodiment. The gap between the end edges 139, 139 of the wall section 42 is less than the root diameter of the stud lug in the groove section at 133 to attain such snap anchorage, and the spring of those edges may be enchanced by proximate slots in both ends of the side wall section 42 adjacent the inner side of the end section 41, such as along dotted lines 142 in Fig. 12.

With the opposed stud lugs 124, 124 of the Figs. 9 to 12 incl. embodiment brought to substantial alignment as indicated in Fig. 9, one of the filler shells 135 may be mounted upon one of the stud lugs 124 from one side by snap engagement of its side wall section 42 into the arcuate groove 133. The other filler shell 135 may be engaged upon the other stud lug 124 in like fashion from the other side. It will be seen from Fig. 9 that when the pair of filler shells 135, 135 are so assembled between the opposed ends 132, 132 of the substantially aligned stud lugs 124, 124, their flat end faces 43, 43 are substantially in face-to-face engagement, or are so closely juxtaposed, as to prevent any appreciable relative movement of the stud lugs or rotation of the side sections 22, 22 on which the stud lugs are mounted. The two filler shells 135, 135 together form an abutment means which is removably interposed between the opposed ends of the stud lugs, with substantial mergence of external cylindrical surfaces. As in the Figs. 1 to 8 incl. embodiment, rapid disassembly of parts is simply attained by driving the filler shells 135, 135 laterally off from opposite sides of the stud lugs 124, 124, thereafter permitting ready disassembly of link sections in the above-indicated manner.

In the modified form illustrated in Figs. 13 and 14, each stud lug 224 has a reduced, coaxially-extending nub or head 233, circumscribed by a circular shoulder 232 disposed in a plane substantially normal to the axis of the stud lug. The space between the two opposed circular shoulders 232, 232 is filled in by an interfitted pair of members 235, 235, each of which, similar to the members 35, 35 of the Figs. 1 to 8 incl. embodiment, has a main portion 236 snugly receivable between the opposed shoulders, and a pair of opposed, laterally-spaced, curved portions or fingers 237, 237. As in the first embodiment, the pair of fingers 237, 237 of one member 235 are adapted to lap against the sides of the pair of fingers 237, 237 of the other member 235, as is indicated in Fig. 13, together to fill in the remainder of the space between the shoulders 232, 232.

As will be understood from Fig. 14, the spacing of the tips 239, 239 of the pair of fingers 237, 237 of each member 235 is less than the diameter of each cylindrical head 233, so as to be snapped thereabout. If desired, the finger tips 239, 239 may be provided with opposed, substantially flat surfaces, adapted snugly to engage against the side surfaces 240, 240 of the main body 236 of the cooperating member 235, and, if desired, such side surfaces may be disposed convergingly with the opposed tip faces oriented relative to each other in similar fashion so as to attain snap engagement between the two members 235, 235, as will be more fully understood from the explanation of the Figs. 16 to 20 incl. embodiment, and more particularly, with respect to Fig. 20.

As indicated in Fig. 15, cooperating interfittable filler or abutment members to be forced or wedged in between opposed ends of stud lug structures may be in the form of a cooperating pair of members 335, 335, each similar in construction to the members 235, 235, except that each is provided with an internal, transversely-extending integral fin 44 which may be substantially semi-circular in shape, with the two fins adapted to be brought to substantial alignment between opposed spaced ends 45, 45 of the stud lugs 324, 324 so as there to serve as additional filler or abutment means supplementing that provided by the interfitted members 335, 335 intervening the shoulders 232, 232. The nubs 233, 233, of course, may be provided as separate elements having, for example, externally threaded shanks 333, 333, threadably engaged in internally threaded sockets in the ends of the stud lugs 324, 324, as is diagrammatically indicated in Fig. 15.

As illustrated in Figs. 16 to 20 incl., the principle of the present invention may be practiced to advantage in connecting together or holding in alignment headed stud lugs of the type illustrated in my above-identified copending patent application Serial No. 290,739. In that embodiment, each chain shackle side section 422 may carry extending laterally therefrom a stud lug 424 in the form of a headed member with an enlarged head 46 thereof laterally spaced from the side of the link section 422 by a cylindrical neck 47 of lesser diameter. Thus, the back end of each stud lug head 46 is in the form of a circular shoulder 48 opposed to the side of the link section 422 to which the lug neck 47 is mounted, such as by being made integral therewith or welded thereto.

The means employed in the Figs. 16 to 20 incl. embodiment to connect or hold the opposed stud lugs 424, 424 in substantial alignment may comprise a pair of like members 435, 435 interfitted together to provide a covering collar assembly which fits about the opposed stud lugs and snugly intervenes the space between the tranversely-spaced side link sections 422, 422. Each filler member 435 may comprise a curved main portion 436 having one end abuttable against the inside of one side link section 422 and the other end provided with diametrically opposed, arcuate, laterally-spaced resilient elements or side sections 437, 437. End edges 49, 49 of the pair of side sections 437, 437 of each filler member 435 are preferably shaped to fit against the arcuate surface of the link side section 422, as is best seen from Figs. 16 and 18.

As will be apparent from Figs. 16, 19 and 20, the opposed pair of resilient side sections or elements 437, 437 extend arcuately appreciably more than 180° so that their opposed tip sections or side edges 439, 439 are inturned or spaced apart a distance which may be somewhat less than the diameter of the stud heads 46, 46 so as to attain snap engagement. However, if it is desired that such a filler collar and stud lug covering assembly be free of a tendency to damage the threads of the stud lug heads 46, 46, the spacing between the tip sections or edges 439, 439 of each opposed pair of resilient side sections 437, 437 may be slightly greater than the external diameter of each of the threaded stud heads 46, but will be less than some portion on the opposed cooperating member 435. For example, as indicated in Fig. 20, the opposite side walls 440, 440 of the body section 436 of each member 435 may be convergingly arranged with respect to each other so that that body section is in the nature of a wedge over which the tip sections or side edges 439, 439 of the resilient side sections 437, 437 of the other member 435 are to be snapped. Thus, the snap engagement of each member 435 about the stud lugs may not and need not be directly to the stud lug structure but can be directly only to the cooperating filler member, and may be with respect or directly to both.

As will be understood from Figs. 17, 18 and 20, each of the filler members 435 may be provided with internal rib structure so as to engage behind the enlarged heads 46, 46 of the stud lugs 424, 424, or about their necks 47, 47. For example, the body section 436 of each member 435 may be provided with an arcuate, laterally-extending, internal rib 50 which is adapted to be received between the lug head shoulder 48 and the inner side of the link side section 422 and about the lug neck 47. A similar internal, arcuate rib 51 may be provided on the same member 435 on the inner sides of the side sections 437, 437 to perform a similar function with respect to the other stud lug 424. Thus, as will best be seen from Fig. 20, arcuate, internal rib 50 of one member 435 cooperates with internal, arcuate rib 51 of the other member 435 together substantially to encircle one of the stud lug necks 47. Similarly, remaining internal ribs 50 and 51 substantially encircle the remaining stud lug neck 47. As a result, not only do the filler members 435, 435 cooperatively cover the opposed stud lugs 424, 424 and fill in the space between the opposed inner sides of the link side sections 422, 422, but additionally actually connect them together by the interfitting engagement of the internal ribs 50, 50 and 51, 51 with the stud lug necks 47, 47 and the shoulders 48, 48 provided by the back ends of the enlarged lug heads 46, 46.

It will be noted from Fig. 16 that the interfitting engagement of the members 435, 435 is so oriented with respect to the rotatable side link sections 422, 422 as to dispose the snap-engaged faces in planes at angles to a transverse plane of rotation to which the axes of rotation are normal. Thus, the members 435, 435 are moved into operative positions from opposite sides of the stud lugs 424, 424 in planes which are substantially parallel to the axes of the link side sections 422, 422. Consequently, any tendency for the stud lugs 424, 424 to be rotated is directly opposed by the abutment of the inner faces of the side sections 437, 437 with the side faces 440, 440. Obviously, the mounted members 435, 435 may be readily dismounted to permit disassembly of the link sections by driving them out laterally in opposite directions away from the stud lugs 424, 424, along the inner sides of the link side sections 422, 422.

In the embodiment illustrated in Figs. 4 to 8 incl., the engagement of fins 38–38 into the notches 34–34 eliminates any tendency for the filler collar assembly 35, or parts thereof, to rotate in service relative to stud lugs 24, 24. Such a function may be served by other means, as is illustrated in Figs 21 and 22. As therein proposed, the interfitting C-shaped snap members 535, 535 may be similar to C-shaped members 35, 35 of Figs. 4 to 8 incl., except for the omission of internal fins 38–38. Preferably the notches 34–34 are also omitted. In lieu thereof the main body of each C-shaped member 535 is provided with oppositely extending fingers or projections 52, 52 arranged substantially parallel to the axis of the filler ring assembly and seated in aligned notches 53, 53 on one side of aligned stud lug body sections 531, 531. Each lug body section 531 has a pair of such notches on diametrically opposite sides thereof, so that either of the like C-shaped members may be snapped into seated position from either side of the stud lug structure. The parts are thus interchangeable as in the other embodiments.

The stud lugs alignment-maintaining means comprising a plurality of interengaging means is provided by the abutment filler ring means of Figs. 4 to 8 incl., consisting of the interfitting snap members 35, 35; the opposed abutting filler half-shell members 135, 135 of Figs. 9 to 12 incl.; the abutment filler ring means 235, 235 and 335, 335, respectively, of Figs. 13 and 14, and of Fig. 15; the bridging and covering filler collar structure of Figs. 16 to 20 incl.; and the interfitting snap members 535, 535 of the Figs. 21 and 22 embodiment. In each case the plurality of interengaging means have opposed portions each carrying laterally-spaced resilient elements having inturned tip sections which are snap mounted about the stud lugs. The C-shaped collar members 35, 35, and 535, 535, are respectively snapped directly onto the stud lug tip elements or heads 33, 33, and 533, 533. The half-shells 135, 135 are snapped directly onto the stud lugs 131, 131. The collar parts 235, 235 and 335, 335 are snapped directly onto the stud lug tip heads or nubs 233, 233, and may also have material frictional engagement or snap connection between their finger tips 239, 239 and contact faces 240, 240. The collar parts 435, 435 are mounted on and about the threaded and headed stud lugs 424, 424 while being snap-engaged with each other; and thus are snap-mounted about the stud lugs. It is to be understood that the snap engagement feature of the present invention may be embodied in constructions where the plural-parts filler means is mounted on the aligned stud lugs even though the snap engagement of resilient laterally-spaced elements thereof may be directly between the filler means parts rather than directly to the stud lugs, or may involve both of these types of snap engagement and mounting, in addition to snap engagement of an intervening part such as directly to an element mounted on a stud lug as is the case of providing stud lug nub 233 in the form of a separate part threadably engaged in the end of stud lug 324, as proposed in Fig. 15. In the latter structure nub 233 actually is a part of its supporting stud lug body 224 though formed separately therefrom and separably mounted thereon, and thus the stud lugs alignment-maintaining means 235, 235 are snapped about the stud lug means in this embodiment just as in all of the other embodiments.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A chain link shackle comprising, in combination; a plurality of connectable link sections including a pair of opposed rotatable side sections; a pair of stud lugs with one fixedly mounted on each side section, said stud lugs being adapted to be rotated to opposed, spaced-apart and substantially aligned relation with assembly of said sections; and stud lugs alignment-maintaining means comprising a plurality of interengaging means having opposed portions each carrying a pair of laterally-spaced resilient elements provided with inturned tip sections snap mounted about said stud lugs when the latter are brought to substantial alignment temporarily to prevent said stud lugs from being rotated out of alignment, said means being unsnappable to permit said stud lugs to be rotated relative to each other with demountable rotation of said side sections for disassembly of said link sections.

2. The chain link shackle as defined in claim 1, characterized by said alignment-maintaining means as comprising a plurality of interfittable parts of an abutment filler ring means interposable between opposed portions of said stud lugs, each of said parts being demountably snap mounted for ready disassembly of said ring means.

3. The chain link shackle as defined in claim 2, characterized by said ring means as comprising a two-part collar with one part snapped on one of said stud lugs and the other snapped on the other of said stud lugs.

4. The chain link shackle as defined in claim 3, characterized by said stud lugs having opposed spaced shoulders, with each of said collar parts having a filler portion of a width substantially equal to the width of the space between said shoulders, and a snap portion removably engageable with one of said stud lugs.

5. The chain link shackle as defined in claim 4, characterized by each of said stud lugs having a tip end extending beyond its shoulder into the space between said opposed shoulders, the snap portion of each of said collar parts being snapped about one of said tip ends.

6. The chain link shackle as defined in claim 5, characterized by the snap portions of said collar parts being lapped against each other together substantially to fill in the space between said shoulders not occupied by the filler portions of said collar parts.

7. The chain link shackle as defined in claim 6, characterized by each of said stud lug tip ends being of reduced section, and each of said collar parts being C-shaped with its medial section constituting said filler portion from opposite sides of which inwardly-curved, laterally-spaced fingers extend, a pair of said fingers on each collar part constituting its snap portion with the fingers of that pair snapped about the reduced tip end of one of said stud lugs.

8. The chain link shackle as defined in claim 7, characterized by each C-shaped collar part being a substantial duplicate of the other, arcuate and extending through more than 180° whereby the tips of said fingers are spaced less than the diametrical spacing thereof to effect snap engagement of one of said stud lug reduced tip ends, said fingers being approximately one-half the width of the filler portion of each collar part whereby two lapped fingers substantially bridge the stud lug spacing with the filler portion of one collar part fittable between the tips of the pair of fingers of the other collar part and with the two pairs of fingers mutually overlapping whereby said pair of interfitted collar parts together form an assembled substantially symmetrical filler ring structure.

9. The chain link shackle as defined in claim 8, characterized by said stud lugs being substantially cylindrical at their shoulders with the reduced tip members also being substantially cylindrical and extending substantially coaxially of said stud lugs beyond the shoulders of the latter, said assembled filler ring structure being substantially cylindrical and having a bore into which said stud lug tip members are fitted in opposed relation with the outer diameter of said ring structure being approximately equal to that of said stud lugs at their shoulders to fill in the space between the latter with substantial mergence of outer surfaces.

10. The chain link shackle as defined in claim 8, characterized by said tip members being necked to have a section of lesser transverse dimension and said collar parts having opposed inwardly-extending interlocking portions to engage on opposite sides of said neck section.

11. The chain link shackle as defined in claim 10, characterized by said necked section being formed by diametrically-located transverse notches with said interlocking portions being in the form of opposed ribs engaged in said notches.

12. The chain link shackle as defined in claim 1, characterized by said interengaging means being in the form of a pair of opposed filler members having abutted heads intervening and together substantially filling a space existing between opposed ends of said stud lugs with said filler members having anchorage portions snap mounted on said stud lugs.

13. The chain link shackle as defined in claim 12, characterized by said filler members being in the form of cup means with each having a side wall gap through which a stud lug portion may be snapped.

14. The chain link shackle as defined in claim 13, characterized by each of said cup means having a circular head with an arcuate side wall flange extending substantially normal to more than 180° of the edge of said head to be snapped concentrically about the outer end of one of said stud lugs.

15. The chain link shackle as defined in claim 14, characterized by the outer end of each stud lug being provided with a transverse shallow groove extending more than 180° circumferentially thereof into which said arcuate side wall flange is to be snapped.

16. The chain link shackle as defined in claim 15, characterized by said side wall flange and its receiving groove being C-shaped in transverse section with the stud lug body in the grooved part thereof being of a groove root diameter greater than the spacing of the opposed ends of said flange whereby the latter may be snapped into said groove with the latter of a depth substantially equal to the thickness of said flange for substantial mergence of outer flange and stud lug surfaces.

17. A chain link shackle comprising, in combination; a plurality of connectable link sections including a pair of opposed, rotatable side sections; a pair of stud lugs with one fixedly mounted on each side section to extend laterally from the side thereof, said stud lugs being adapted to be rotated to opposed, spaced-apart, and substantially aligned relation with assembly of said sections; a pair of opposed nubs coaxially extending from the opposed ends of said stud lugs with the latter defining transversely-spaced abutment shoulders, each of said nubs having a pair of diametrically-opposed, transverse notches in the sides thereof; and an assembled two-part, substantially symmetrical, filler ring structure disposed about said opposed nubs and substantially filling the space between said opposed shoulders with the outer surface of said ring structure being disposed substantially flush with the outer surfaces of said stud lugs, each part of said ring structure comprising a C-shaped member having a main body of a width substantially equal to the distance between said shoulders for receptive filling thereof, and a pair of diametrically-spaced, arcuate spring fingers extending from opposite sides of said main body with the tips thereof spaced a distance less than the transverse dimension of each of said nubs so that the latter is snapped therebetween, each of said fingers being in width about one-half the spacing between said shoulders and with each pair of said fingers lapping along the sides of the other pair to substantially fill in the portions of that space intervening said C-shaped body portions, each of said spring fingers having an inwardly-extending rib with the opposed pair of ribs of one C-shaped member being adapted to be received in the pair of notches in the opposite sides of one of said nubs.

References Cited in the file of this patent
UNITED STATES PATENTS

| | | |
|---|---|---|
| 785,881 | Hill | Mar. 28, 1905 |
| 1,831,765 | Gouverneur | Nov. 10, 1931 |
| 2,347,088 | Dock | Apr. 18, 1944 |
| 2,621,471 | Dock | Dec. 16, 1952 |

FOREIGN PATENTS

| | | |
|---|---|---|
| 620,330 | Great Britain | Mar. 23, 1949 |